United States Patent
Yamaguchi (10) Patent No.: US 6,847,743 B2
(45) Date of Patent: Jan. 25, 2005

(54) POLARIZATION SCRAMBLER UNIT AND MULTI-REPEATER TRANSMISSION SYSTEM INCORPORATING THE SAME

(75) Inventor: Shohei Yamaguchi, Tokyo (JP)

(73) Assignee: NEC Corporation, Tokyo (JP)

(*) Notice: Subject to any disclaimer, the term of this patent is extended or adjusted under 35 U.S.C. 154(b) by 94 days.

(21) Appl. No.: 10/224,454

(22) Filed: Aug. 21, 2002

(65) Prior Publication Data

US 2003/0039427 A1 Feb. 27, 2003

(30) Foreign Application Priority Data

Aug. 22, 2001 (JP) .................................. 2001-251050

(51) Int. Cl.⁷ ................................................ G02B 6/00
(52) U.S. Cl. ........................... 385/11; 385/16; 385/23; 398/2; 398/6; 398/65; 398/152; 398/177
(58) Field of Search ........................ 398/2, 6, 11, 18, 398/65, 152, 177; 385/6, 7, 11, 16, 23

(56) References Cited

U.S. PATENT DOCUMENTS

| | | | | |
|---|---|---|---|---|
| 5,031,236 A | * | 7/1991 | Hodgkinson et al. ....... | 398/152 |
| 5,247,382 A | * | 9/1993 | Suzuki ........................ | 398/201 |
| 5,841,557 A | * | 11/1998 | Otsuka et al. ................ | 398/65 |
| 6,115,155 A | * | 9/2000 | Liu et al. ........................ | 398/5 |
| 6,396,575 B1 | * | 5/2002 | Holland ..................... | 356/73.1 |

FOREIGN PATENT DOCUMENTS

| | | | | |
|---|---|---|---|---|
| JP | 03-067231 | 3/1991 | ............. | G02F/1/35 |
| JP | 06-275898 | 9/1994 | ............. | H01S/3/10 |

* cited by examiner

Primary Examiner—Brian Healy
Assistant Examiner—Daniel Petkovsek
(74) Attorney, Agent, or Firm—McGinn & Gibb, PLLC (57) ABSTRACT

A polarization scrambler unit includes a plurality of polarization scramblers, a switching unit for coupling one of the polarization scramblers to a transmission line fiber, a detection unit for detecting an output signal from the polarization scrambler coupled to the transmission line fiber, and a controlling unit for switching, via the switching unit, between the polarization scramblers and another polarization scrambler whenever a false output signal is detected by the detection unit. Thus, the polarization scrambler unit has a redundant structure.

9 Claims, 12 Drawing Sheets

POLARIZATION SCRAMBLER UNIT AND MULTI-REPEATER TRANSMISSION SYSTEM INCORPORATING THE SAME

FIELD OF THE INVENTION

The present invention relates to a polarization scrambler unit for correcting gain polarized-light dependency of an optical amplification repeater, and to a multi-repeater transmission system incorporating the same.

BACKGROUND OF THE INVENTION

In general, a polarization state of an optical signal propagating through a multi-repeater transmission system is an elliptically polarized wave which has a major axis and a minor axis perpendicular to the major axis. When an optical amplification repeater is operated under a gain saturation state, and the powers differ between directions along the major and minor axes of the polarized-light of signal, the gain saturation state varies in the direction of polarization of light due to the power difference. As a result, the gain becomes unequal, and thus the amplification signal power and noise power vary according to the polarization state of the optical signal input into the optical amplification repeater.

Accordingly, a recent multi-repeater transmission system uses an optical component with an extremely small polarized-light dependent optical loss as an optical amplification repeater, while making polarization scattering of a transmission optical fiber small, thereby reducing polarized-light dependency of a transmission line. On the other hand, optical amplification repeaters are used in a gain saturation state while inserting them in an optical fiber transmission line at regular intervals, thereby automatically compensating for transmission loss of the light signal caused by the optical fiber.

Since a state of polarized-light in the optical fiber transmission line fluctuates at points of time according to changes of the external environment (e.g., temperature), the polarization state of the input signal into the optical amplification repeater also changes regularly. Therefore, if the optical amplification repeater has the above-described property, although the polarized-light dependency of the transmission line is reduced, the amplified light signal power and the noise power may fluctuate according to the input polarization state. Fluctuations in light signal power to accumulated noise power ratio (S/N ratio) after transmission changes the receiving characteristic of the light signal. This phenomenon becomes significant as the number of the amplification repeaters incorporated in the multi-repeater transmission system is increased.

In order to reduce such an effect caused by polarized-light dependency of the input signal into the optic amplification repeater, a technique is known in which a polarization scrambler, for example, as shown in FIG. 12(1) is used. By inserting this polarization scrambler on the output side of the light source, the polarization of the signal can be scrambled, by which each polarized-light component of the optical amplification repeater can uniformly be activated to make the amplification gain equal with respect to the polarized-light axis. Specifically, in FIG. 12(1), signal light from a light source 101 with any polarization is guided by an optical fiber 102, and branched into two lines by a 3dB fiber coupler 103. One of the signals is subjected to frequency modulation by an acousto-optic modulator 104. Then, both of the signals are made into linearly-polarized waves by polarization controllers 105a and 105b including a ½λ plate and a ¼λ plate, respectively, precisely adjusted such that both optical powers and phases are equal and same (not shown), and combined by a polarized-light combiner 106. As a result, from polarized-light combiner 106, an output signal is obtained which has been polarization modulated through frequency modulation by the acousto-optic modulator 104 that performs modulation from linear polarization to circular polarization and again to linear polarization.

In a conventional multi-repeater transmission system, a polarization scrambler 2 is inserted immediately before a transmission line fiber 4-1 as shown in FIG. 12(2). In this multi-repeater transmission system, a transmitter 1 and a receiver 2 are connected via the transmission line fibers 4-1, 4-2 . . . , and a plurality of optical amplification repeaters 5-1, 5-2 . . . are inserted between the transmission line fibers 4-1, 4-2 . . .

However, conventional technique has the following problems.

According to the conventional technique, a failure polarization scrambler has to be exchanged for a new one, which is troublesome and renders the multi-repeater transmission system unavailable until the exchange is completed.

In a conventional multi-repeater transmission system, gain polarized-light dependency of the optical amplification repeaters is accumulated due to multistage connection. The only solution to this problem is to reduce gain polarized-light dependency for each optical amplification repeater. However, an extended length of a recent transmission line has increased the number of optical amplification repeaters, requiring higher performance of each optical amplification repeater. As a result, the gain polarized-light dependency per optical amplification repeater has reached the limit.

SUMMARY OF THE INVENTION

A first objective of the present invention is to provide a technique by which trouble and loss caused by failure of a polarization scrambler can be minimized. A second objective of the present invention is to provide a technique by which gain polarized-light dependency of the whole multi-repeater transmission system can be enhanced regardless of gain polarized-light dependency per optical amplification repeater.

A polarization scrambler unit according to present invention comprising: a plurality of polarization scramblers; a switching unit for coupling one of the polarization scramblers to a transmission line fiber; a detection unit for detecting an output signal from the polarization scrambler coupled to the transmission line fiber; and a controlling unit for switching the polarization scrambler to other polarization scrambler using the switching unit when the output signal detected by the detection unit is false (claim 1).

The switching unit comprises: an optical switch inserted between the polarization scrambler and the transmission line fiber; and a switch driving circuit for opening and closing the optical switch (claim 2). The switching unit comprises: an optical amplifier inserted between the polarization scrambler and the transmission line fiber; and an amplifier controlling circuit for controlling the optical amplifier (claim 3).

The controlling unit comprises: a clock detecting circuit for detecting a clock signal from the output signal from the transmission line fiber; and a scrambler driving circuit for driving the polarization scrambler in synchronous with the clock signal detected by the clock detecting circuit (claim 4).

The polarization scrambler comprises a set of serially connected high-speed and low-speed polarization scramblers (claim 5). The plurality of polarization scramblers are two polarization scramblers (claim 6).

In other words, a polarization scrambler unit according to the present invention has a redundant structure in which a signal input into the unit is branched by an optical coupler into two lines which have polarization scramblers inserted therein, the branched signals are coupled by the optical coupler again and output to a transmission line. As usual, only the polarization scrambler on one line (a current system) is activating. The polarization scrambler on the other line (an auxiliary system) is switched off and the line itself is also cut off by an optical switch. The system is switched to the auxiliary system by a switching unit when any failure occurs to the current system.

A multi-repeater transmission system according to present invention in which a transmitter and a receiver are connected via a transmission line fiber and a plurality of optical amplification repeaters are inserted in the transmission line fiber, wherein the plurality of polarization scrambler units according to any one of claims 1 to 6 are inserted in the transmission line fiber (claim 7). The polarization scrambler units are inserted for every constant number of the optical amplification repeaters (claim 8).

In other words, in the multi-repeater transmission system according to the present invention, polarization scrambler units of the invention are inserted (e.g., for every 10 repeaters) in order to level, during transmission, the accumulated gain polarized-light dependency of the optical amplification repeaters caused by multistage connection.

BRIEF DESCRIPTION OF THE DRAWINGS

FIG. 12(1) is a diagram showing a configuration of an exemplary polarization scrambler; and FIG. 12(2) is a block diagram showing a conventional multi-repeater transmission system.

DETAILED DESCRIPTION OF THE INVENTION

Figure 1:
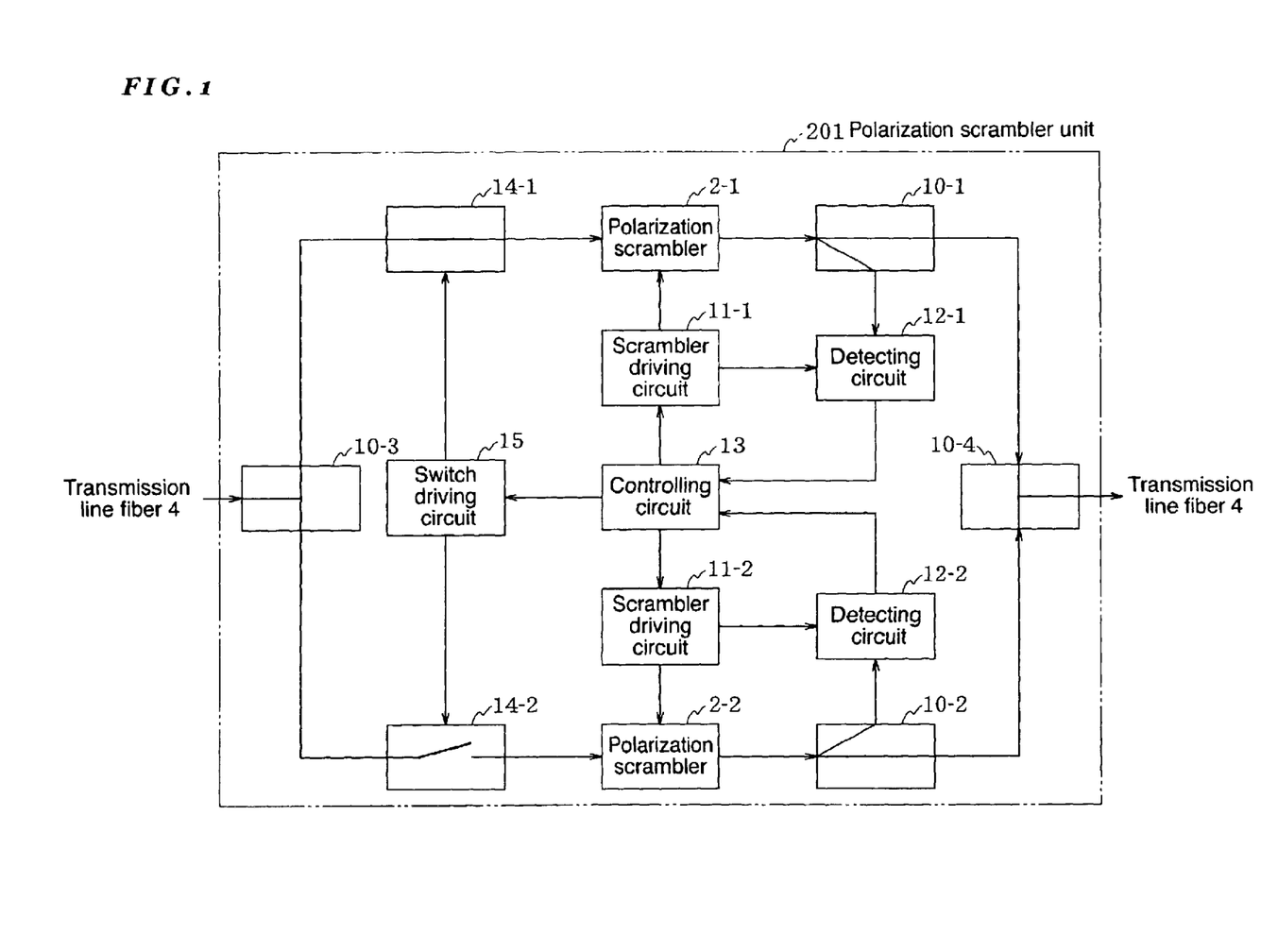
FIG. 1 is a block diagram showing a first embodiment of a polarization scrambler unit according to the present invention.

FIG. 1 is a block diagram showing a first embodiment of a polarization scrambler unit of the invention. Hereinafter, the first embodiment will be described with reference to this figure.

A polarization scrambler unit 201 of the first embodiment is provided with: two polarization scramblers 2-1 and 2-2; a switching unit (described later) for coupling either one of the polarization scramblers 2-1 and 2-2 to a transmission line fiber 4; a detection unit (described later) for detecting an output signal from the polarization scrambler 2-1 (or the polarization scrambler 2-2) coupled to the transmission line fiber 4; and a controlling unit (described later) for switching, by the switching unit, between the polarization scrambler 2-1 and the polarization scrambler 2-2 when a false output signal is detected by the detection unit.

The switching unit is provided with optical switches 14-1 and 14-2 which are inserted between the transmission line fiber 4 and the polarization scramblers 2-1 and 2-2, respectively; a switch driving circuit 15 for opening or closing the optical switches 14-1 and 14-2; an optical coupler 10-3 for branching light from the transmission line fiber 4 to the optical switches 14-1 and 14-2; and an optical coupler 10-4 for combining the light from the polarization scramblers 2-1 and 2-2. The optical switches 14-1 and 14-2 may be mechanical type or non-mechanical type. The switch driving circuit 15 may be, for example, an electronic switch which controls a voltage or current required for operation of the optical switches 14-1 and 14-2.

The detection unit is provided with: optical couplers 10-1 and 10-2 for branching light from the polarization scramblers 2-1 and 2-2, respectively; and detecting circuits 12-1 and 12-2 for detecting the light branched from the optical couplers 10-1 and 10-2, respectively. Each of the detecting circuits 12-1 and 12-2 may include a light receiving element for converting light signals to electric signals and an electronic circuit for detecting false operations by the scrambler driving circuit 11-1 or 11-2.

The controlling unit is provided with: the scrambler driving circuits 11-1 and 11-2 including electronic switches for controlling a voltage or current required for operation of the polarization scramblers 2-1 and 2-2; and a controlling circuit 13 for controlling the switch driving circuit 15 as well as the scrambler driving circuits 11-1 and 11-2 based on the output signals from the detectors 12-1 and 12-2, respectively. The controlling circuit 13 may be, for example, a microcomputer configured with a CPU associated with a ROM, a RAM, input/output interface circuits, a program and the like.

The input into the polarization scrambler unit 201 is branched into two lines by the optical coupler 10-3. Each of the lines is connected to the optical switch 14-1 or 14-2 whose output terminal is in turn connected to the polarization scrambler 2-1 or 2-2. The output terminals of the polarization scramblers 2-1 and 2-2 are connected to the optical couplers 10-1 and 10-2, respectively, whose main output terminals are in turn connected to the optical coupler 10-4. A combined output signal from the optical coupler 10-4 is output from the polarization scrambler unit 201 as an output signal.

The optical switches 14-1 and 14-2 are connected to the two respective output terminals of the switch driving circuit 15. The polarization scramblers 2-1 and 2-2 are connected to one of the output terminals of the scrambler driving circuits 11-1 and 11-2, respectively. The other output terminals of the scrambler driving circuits 11-1 and 11-2 as well as the branched output terminals of the optical couplers 10-1 and 10-2 are connected to the two respective input terminals of the detectors 12-1 and 12-2, respectively. The output terminals of the detectors 12-1 and 12-2 are connected to two respective input terminals of the controlling circuit 13. The three output terminals of the controlling circuit 13 are connected to the input terminals of the two scrambler driving circuits 11-1 and 11-2 and the input terminal of the switch driving circuit 15.

Hereinafter, operations carried out by the polarization scrambler unit 201 will be described.

The signal input into the polarization scrambler unit 201 is branched by the optical coupler 10-3 into two lines. A signal that propagates the line passing through the optical switch 14-1, the polarization scrambler 2-1 and the optical coupler 10-1 (hereinafter, referred to as a "current system") is combined with a signal that propagates the other line (hereinafter, referred to as an "auxiliary system") by the optical coupler 10-4, which is then output from the polarization scrambler unit 201. In the initial state, the optical switches 14-1 and 14-2 are set ON and OFF, respectively, by the control signal from the controlling circuit 13, so that only the current system are conductive. Similarly, the scrambler driving circuits 11-1 and 11-2 are set ON and OFF, respectively.

When any failure occurs in the current system due to deterioration, damage or the like, the detecting circuit 12-1 optically detects a signal monitored by the optical coupler 10-1 and electrically detects a signal from the scrambler driving circuit 11-1. Then, the controlling circuit 13 outputs a control signal to the switch driving circuit 15 to switch the optical switches 14-1 and 14-2 to OFF and ON states, respectively, and at the same time, outputs a control signal to switch the scrambler driving circuits 11-1 and 11-2 to OFF and ON states, respectively. As a result, the operation switches from the current system to the auxiliary system.

Figure 2:
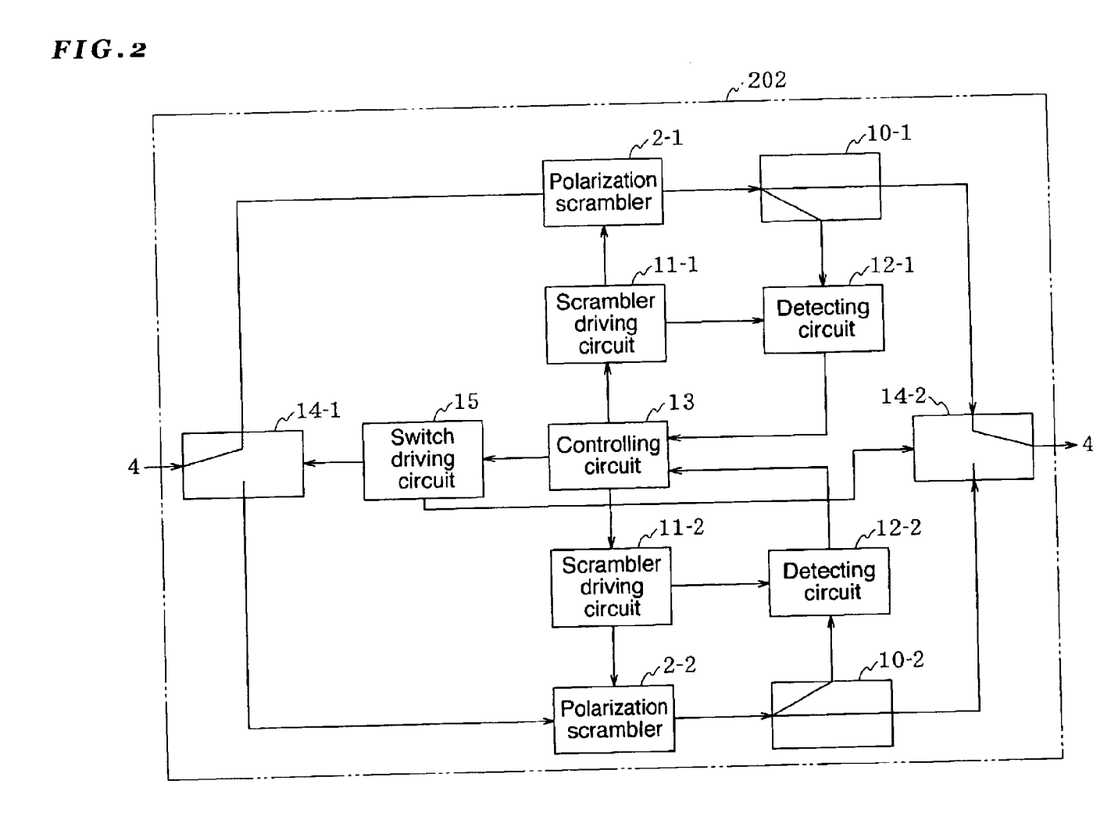
FIG. 2 is a block diagram showing a second embodiment of a polarization scrambler unit according to the present invention.

FIG. 2 is a block diagram showing a second embodiment of a polarization scrambler unit according to the present invention. Hereinafter, the second embodiment will be described with reference to this drawing. The same or similar components as those shown in FIG. 1 will be denoted by the same reference numerals and thus the descriptions thereof are omitted.

The input into the polarization scrambler unit 202 is branched into two lines by an optical switch 14-1. One of the two lines is connected to a polarization scrambler 2-1 and an optical coupler 10-1, while the other line is connected to a polarization scrambler 2-2 and an optical coupler 10-2. The main output terminals of the optical couplers 10-1 and 10-2 are both connected to an optical switch 14-2. The output signal from the optical switch 14-2 is output from the polarization scrambler unit 202 as an output signal.

The optical switches 14-1 and 14-2 are connected to the two output terminals of the switch driving circuit 15. The polarization scramblers 2-1 and 2-2 are connected to one of the output terminals of the scrambler driving circuits 11-1 and 11-2, respectively. The other output terminals of the scrambler driving circuits 11-1 and 11-2 and the branched output terminals of the optical couplers 10-1 and 10-2 are connected to the two respective input terminals of the detectors 12-1 and 12-2, respectively. The output terminals of the detecting circuit 12-1 and 12-2 are connected to the two respective input terminals of the controlling circuit 13. The three output terminals of the controlling circuit 13 are connected to the input terminals of the scrambler driving circuits 11-1 and 11-2 and the input terminal of the switch driving circuit 15.

Hereinafter, operations carried out by the polarization scrambler unit 202 will be described.

The signal input into the polarization scrambler unit 202 is guided by the optical switch 14-1 to either one of the two lines. A signal that propagates the line passing through the polarization scrambler 2-1 and the optical coupler 10-1 (hereinafter, referred to as a "current system") is output from the optical switch 14-2. In the initial state, the optical switches 14-1 and 14-2 allow the signal to pass only through the current system based on the control signal from the controlling circuit 13. At this point, the scrambler driving circuits 11-1 and 11-2 are set ON and OFF by the controller 13, respectively.

When any failure occurs in the current system, the detector 12-1 optically detects a signal monitored by the optical coupler 10-1 and electrically detects a signal from the scrambler driving circuit 11-1. The controller 13 outputs a control signal to the switch driving circuit 15 to connect the optical switches 14-1 and 14-2 to the auxiliary system, and at the same time, outputs a control signal to switch the scrambler driving circuits 11-1 and 11-2 to OFF and ON states, respectively. As a result, the operation switches from the current system to the auxiliary system.

Figure 3:
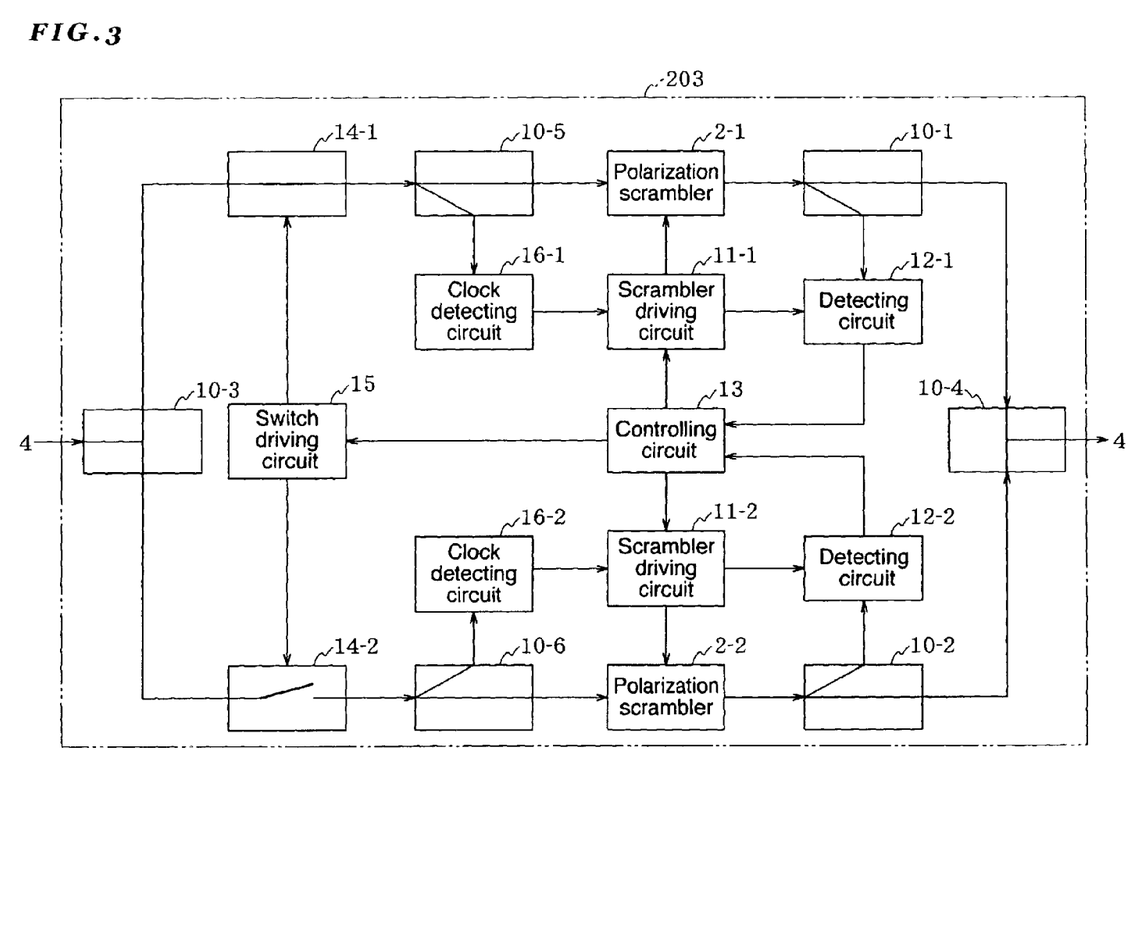
FIG. 3 is a block diagram showing a third embodiment of a polarization scrambler unit according to the present invention.

FIG. 3 is a block diagram showing a third embodiment of a polarization scrambler unit according to the present invention. Hereinafter, the third embodiment will be described with reference to this drawing. The same or similar components as those shown in FIG. 1 will be denoted by the same reference numerals and thus the descriptions thereof are omitted.

A polarization scrambler unit 203 differs from the first embodiment in that an optical coupler 10-5 is inserted between an optical switch 14-1 and a polarization scrambler 2-1, and a clock detecting circuit 16-1 is inserted between a branched output terminal of the optical coupler 10-5 and an input terminal of a scrambler driving circuit 11-1 (an auxiliary system is also configured in the same manner).

The clock detecting circuit 16-1 detects a clock component that is synchronous with the main signal from the signal branched from the optical coupler 10-5, and controls the scrambler driving circuit 11-1 in synchronous with this component (the auxiliary system also works in the same manner). Since the clock component synchronous with the main signal is used, polarization scramble can be performed at high speed.

Figure 4:
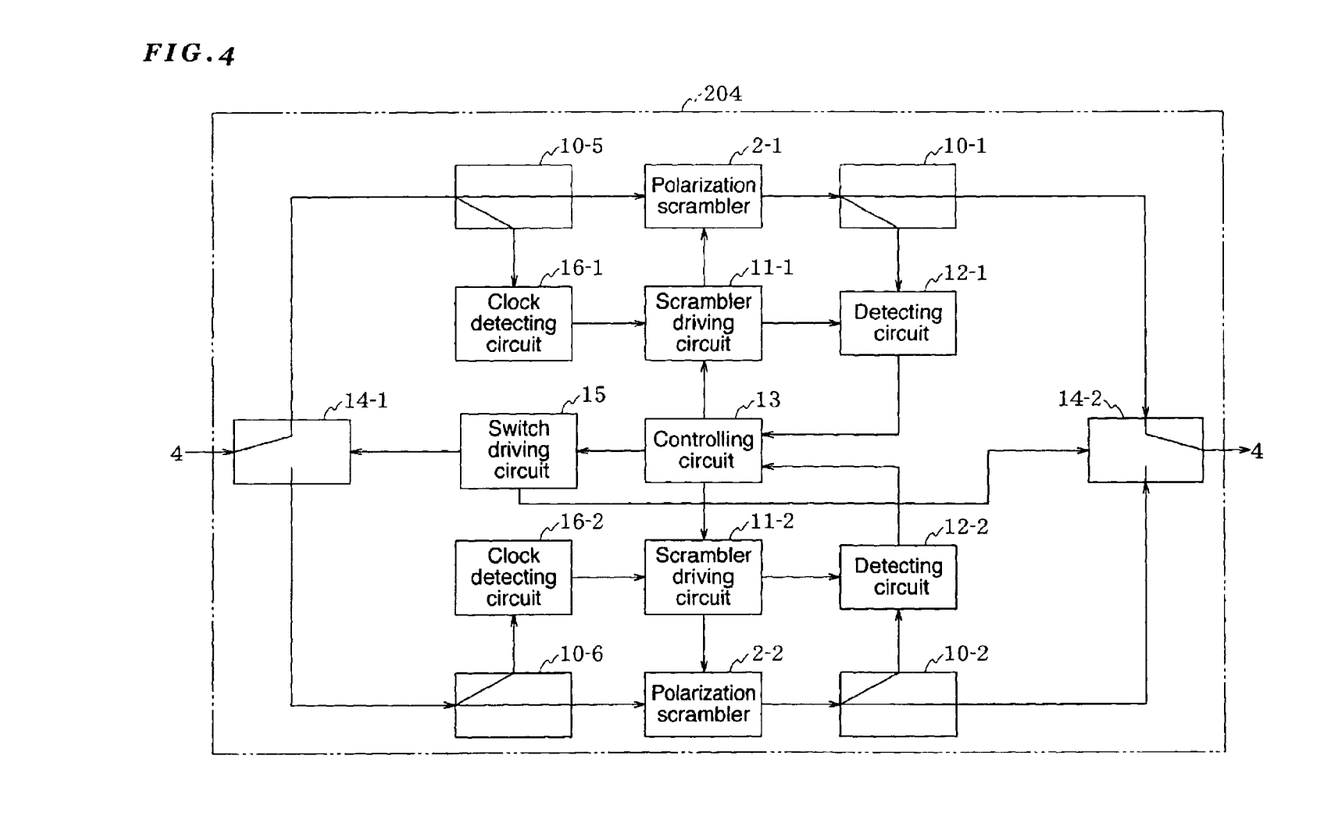
FIG. 4 is a block diagram showing a fourth embodiment of a polarization scrambler unit according to the present invention.

FIG. 4 is a block diagram showing a fourth embodiment of a polarization scrambler unit according to the present invention. Hereinafter, the fourth embodiment will be described with reference to this drawing. The same or similar components as those shown in FIG. 2 will be denoted by the same reference numerals and thus the descriptions thereof are omitted.

A polarization scrambler unit 204 differs from that of the second embodiment in that an optical coupler 10-5 is inserted between an optical switch 14-1 and a polarization scrambler 2-1, and a clock detecting circuit 16-1 is inserted between a branched output terminal of the optical coupler 10-5 and an input terminal of a scrambler driving circuit 11-1 (an auxiliary system is also configured in the same manner).

The clock detecting circuit 16-1 detects a clock component that is synchronous with the main signal from the signal branched from the optical coupler 10-5, and controls the scrambler driving circuit 11-1 in synchronous with this component (the auxiliary system also works in the same manner). Since the clock component synchronous with the main signal is used, polarization scramble can be performed at high speed.

Figure 5:
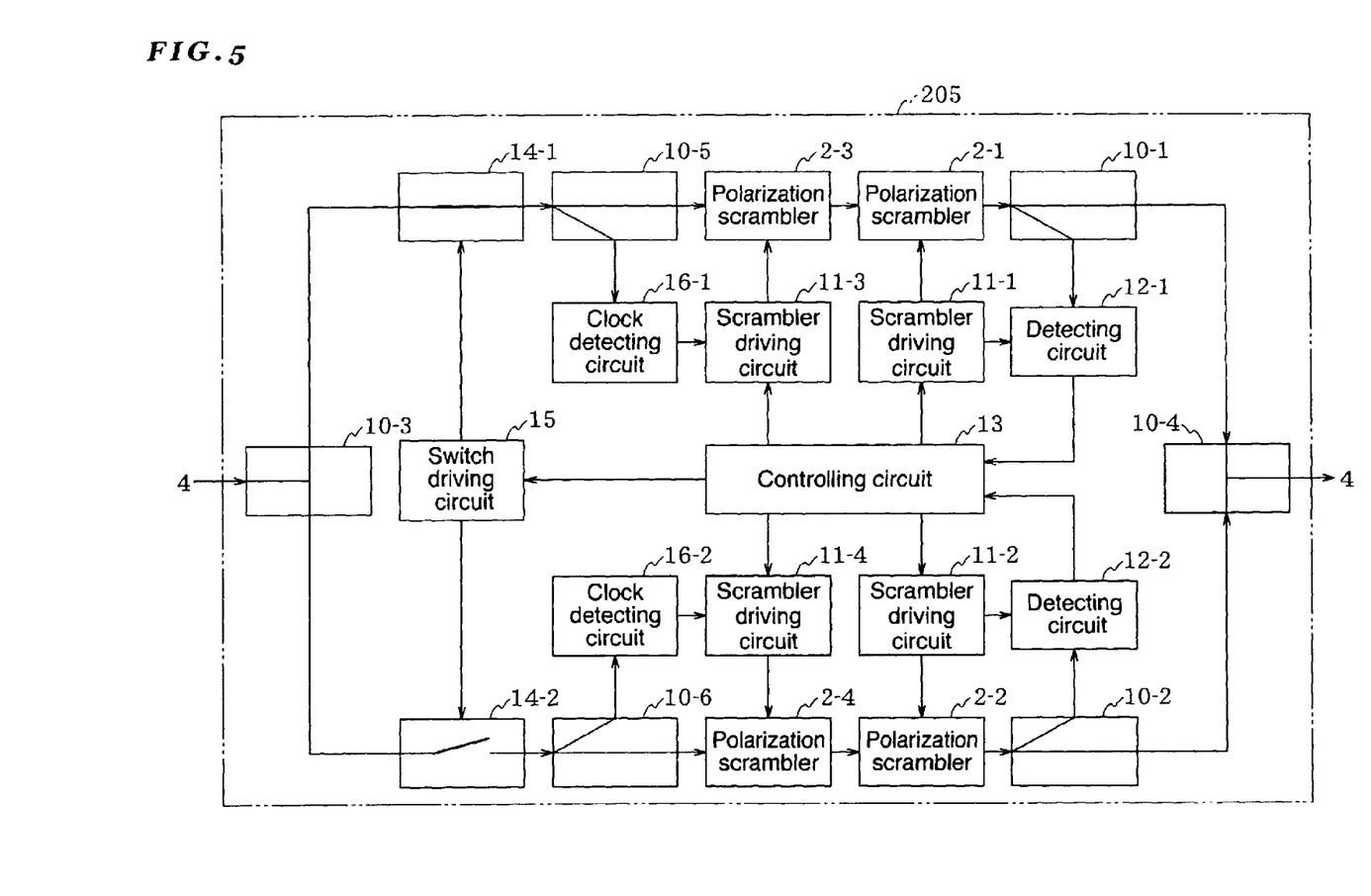
FIG. 5 is a block diagram showing a fifth embodiment of a polarization scrambler unit according to the present invention.

FIG. 5 is a block diagram showing a fifth embodiment of a polarization scrambler unit according to the present invention. Hereinafter, the fifth embodiment will be described with reference to this drawing. The same or similar components as those shown in FIG. 3 will be denoted by the same reference numerals and thus the descriptions thereof are omitted.

A polarization scrambler unit 205 differs from that of the third embodiment in that a polarization scrambler 2-3 is inserted between an optical coupler 10-5 and a polarization scrambler 2-1 and connected to a scrambler driving circuit 11-3, which in turn is connected to a clock detecting circuit 16-1 (an auxiliary system is also configured in the same manner). The polarization scrambler unit 205 allows both high-speed polarization scramble by the polarization scrambler 2-3 and low-speed polarization scramble by the polarization scrambler 2-1 at the same time (the auxiliary system also works in the same manner).

Figure 6:
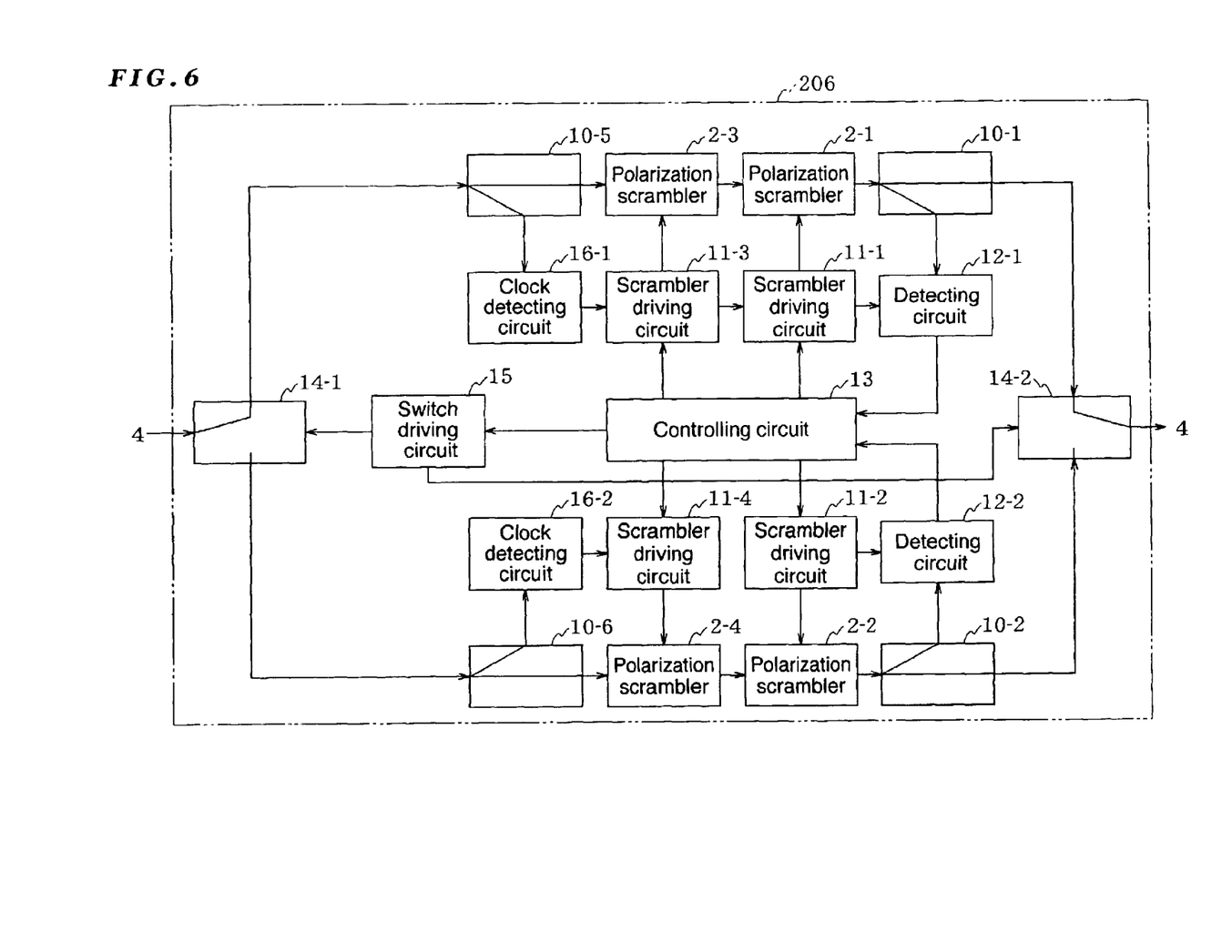
FIG. 6 is a block diagram showing a sixth embodiment of a polarization scrambler unit according to the present invention.

FIG. 6 is a block diagram showing a sixth embodiment of a polarization scrambler unit according to the present invention. Hereinafter, the sixth embodiment will be described with reference to this drawing. The same or similar components as those shown in FIG. 4 will be denoted by the same reference numerals and thus the descriptions thereof are omitted.

A polarization scrambler unit 206 differs from that of the fourth embodiment in that a polarization scrambler 2-3 is inserted between an optical coupler 10-5 and a polarization scrambler 2-1 and connected to a scrambler driving circuit 11-3, which in turn is connected to a clock detecting circuit 16-1 (an auxiliary system is also configured in the same manner). The polarization scrambler unit 205 allows both high-speed polarization scramble by the polarization scrambler 2-3 and low-speed polarization scramble by the polarization scrambler 2-1 at the same time (the auxiliary system also works in the same manner).

Figure 7:
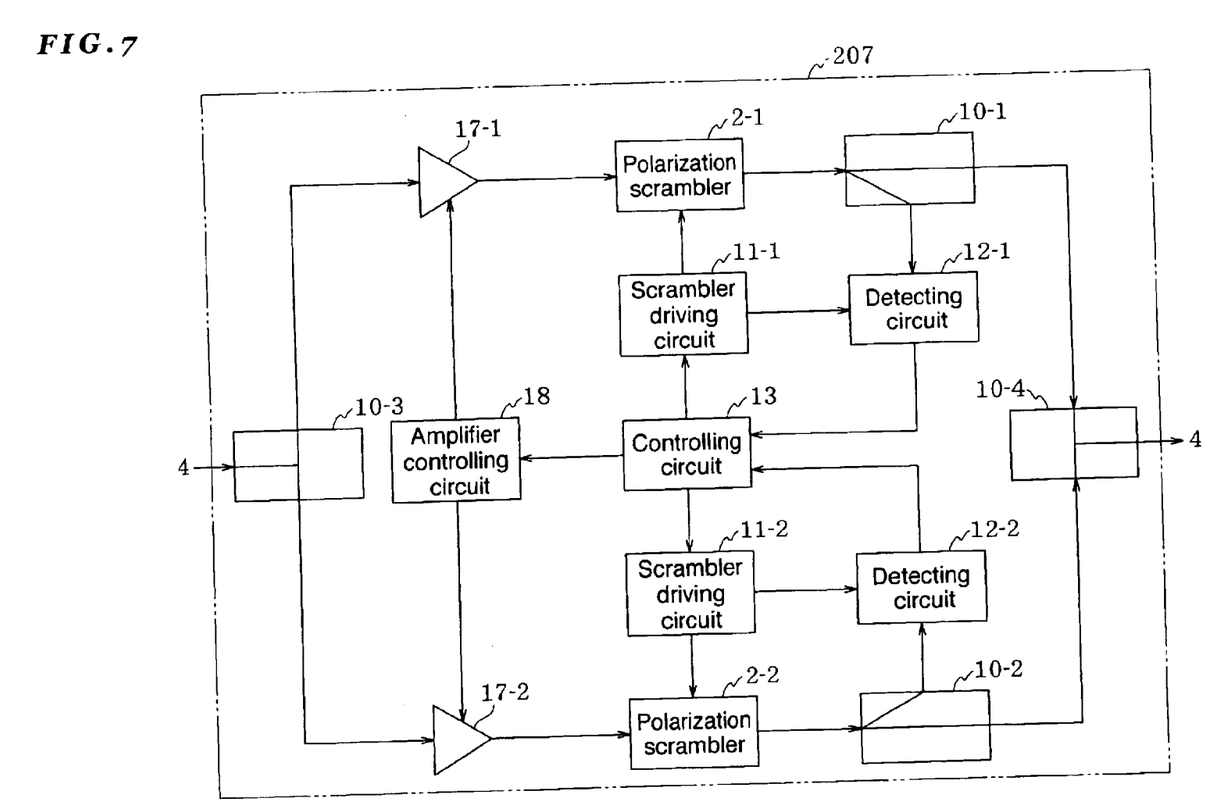
FIG. 7 is a block diagram showing a seventh embodiment of a polarization scrambler unit according to the present invention.

FIG. 7 is a block diagram showing a seventh embodiment of a polarization scrambler unit according to the present invention. Hereinafter, the seventh embodiment will be described with reference to this drawing. The same or similar components as those shown in FIG. 1 will be denoted by the same reference numerals and thus the descriptions thereof are omitted.

A polarization scrambler unit 207 differs from that of the first embodiment in that instead of the optical switches 14-1 and 14-2 and the switch driving circuit 15 shown in FIG. 1, optical amplifiers 17-1 and 17-2 and an amplifier controlling circuit 18 are used. In the polarization scrambler unit 207, the optical amplifiers 17-1 and 17-2 are switched ON and OFF so as to function in the same manner as the optical switches 14-1 and 14-2 shown in FIG. 1.

Figure 8:
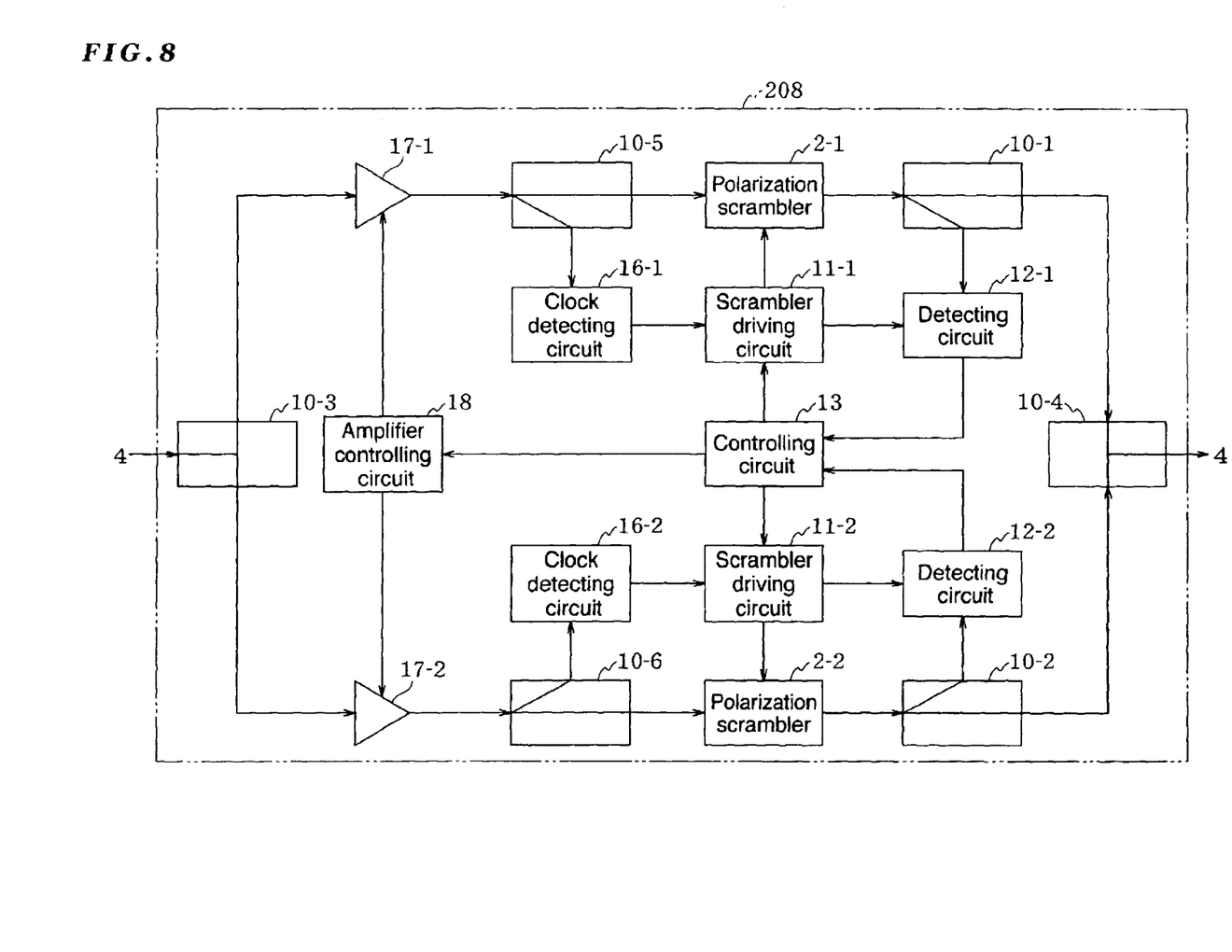
FIG. 8 is a block diagram showing an eighth embodiment of a polarization scrambler unit according to the present invention.

FIG. 8 is a block diagram showing an eighth embodiment of a polarization scrambler unit according to the present invention. Hereinafter, the eighth embodiment will be described with reference to this drawing. The same or similar components as those shown in FIG. 3 will be denoted by the same reference numerals and thus the descriptions thereof are omitted.

A polarization scrambler unit 208 differs from that of the third embodiment in that instead of the optical switches 14-1 and 14-2 and the switch driving circuit 15 shown in FIG. 3, optical amplifiers 17-1 and 17-2 and an amplifier controlling circuit 18 are used. In the polarization scrambler unit 208, the optical amplifiers 17-1 and 17-2 are switched ON and OFF so as to function in the same manner as the optical switches 14-1 and 14-2 shown in FIG. 3. The amplifier controlling circuit 18 is, for example, an electronic switch which controls a voltage or current necessary for operating the optical amplifiers 17-1 and 17-2.

Figure 9:
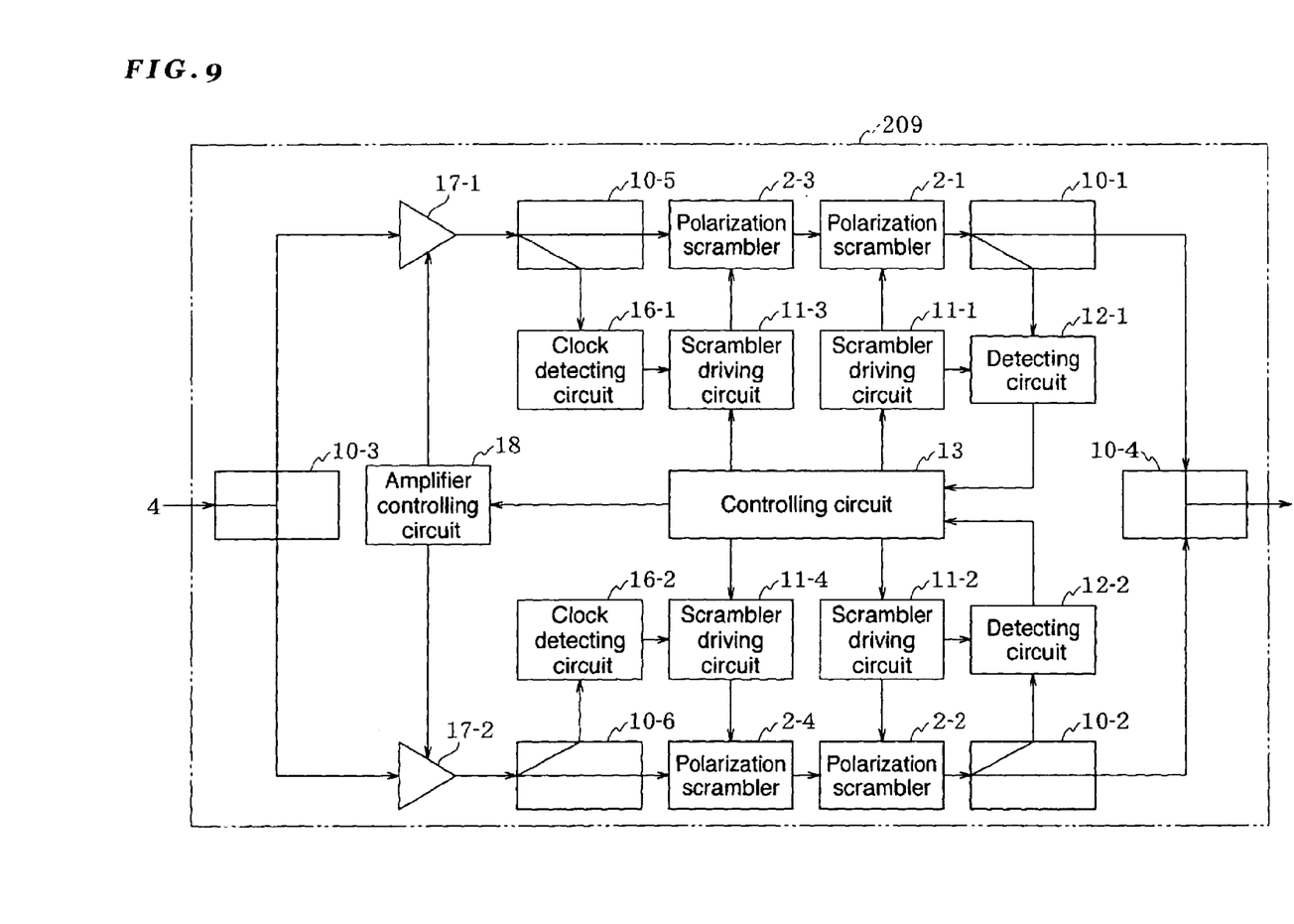
FIG. 9 is a block diagram showing a ninth embodiment of a polarization scrambler unit according to the present invention.

FIG. 9 is a block diagram showing a ninth embodiment of a polarization scrambler unit according to the present invention. Hereinafter, the ninth embodiment will be described with reference to this drawing. The same or similar components as those shown in FIG. 5 will be denoted by the same reference numerals and thus the descriptions thereof are omitted.

A polarization scrambler unit 209 differs from that of the fifth embodiment in that instead of the optical switches 14-1 and 14-2 and the switch driving circuit 15 shown in FIG. 5, optical amplifiers 17-1 and 17-2 and an amplifier controlling circuit 18 are used. In the polarization scrambler unit 209, the optical amplifiers 17-1 and 17-2 are switched ON and OFF so as to function in the same manner as the optical switches 14-1 and 14-2 shown in FIG. 5.

Figure 10:
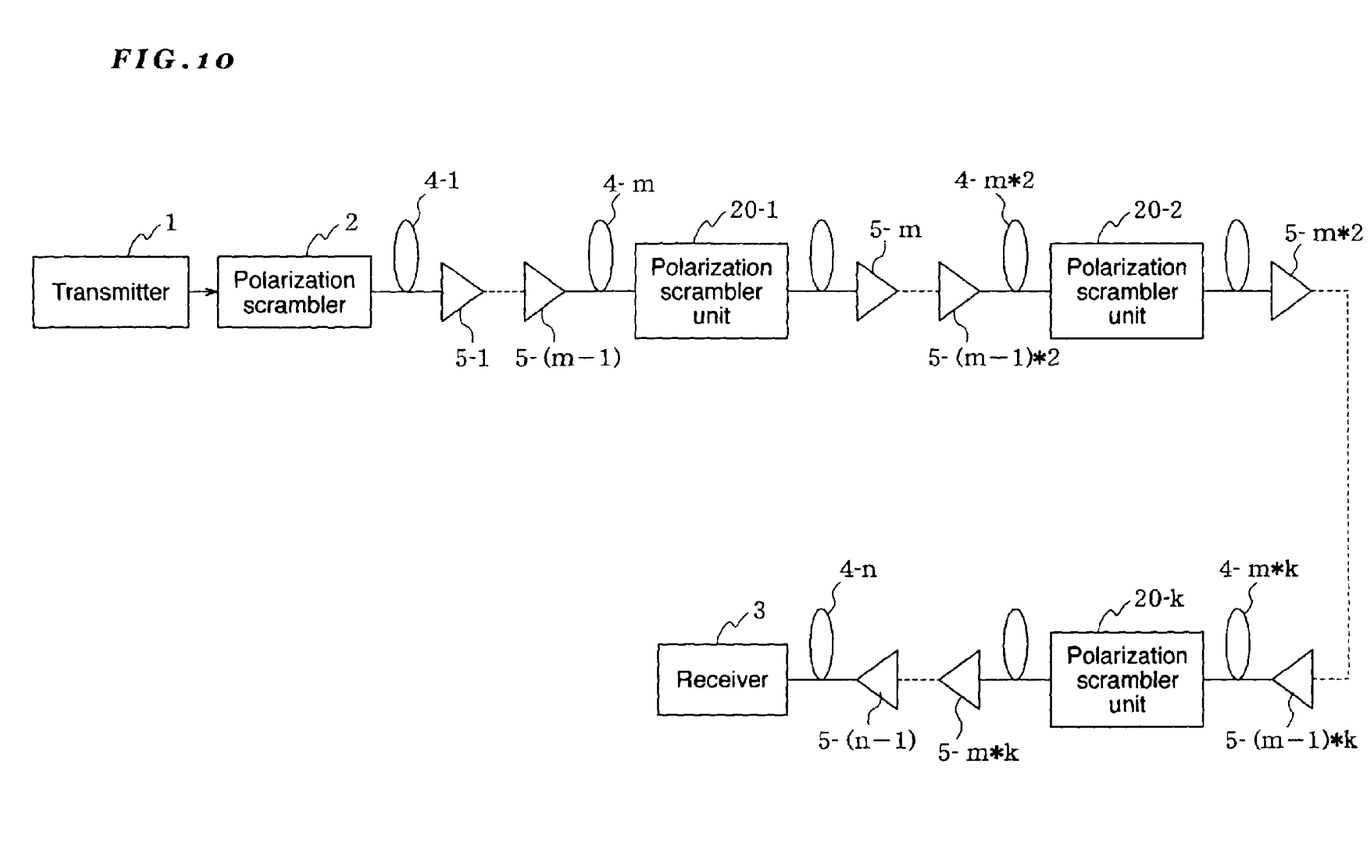
FIG. 10 is a block diagram showing one embodiment of a multi-repeater transmission system according to the present invention.

FIG. 10 is a block diagram showing one embodiment of a multi-repeater transmission system according to the present invention. Hereinafter, this embodiment will be described with reference to this drawing.

In the multi-repeater transmission system according to the present embodiment, a transmitter 1 and a receiver 3 are connected via transmission line fibers 4-1, 4-2 . . . , in which a plurality of optical amplification repeaters 5-1, 5-2 . . . are inserted at regular intervals. A plurality of polarization scrambler units 20-1, 20-2 . . . are inserted for every ten optical amplification repeaters 5-1, 5-2 . . . The polarization scrambler units 20-1, 20-2 . . . may be any one of the above-described polarization scrambler units 201 to 209.

In the multi-repeater transmission system according to the present embodiment, accumulated gain polarized-light dependency of the optical amplification repeaters 5-1, 5-2 . . . occurring due to multistage connection is leveled during transmission by the polarization scrambler units 20-1, 20-2 . . . If a plurality of conventional polarization scramblers are inserted in the transmission line fibers 4-1, 4-2 . . . , malfunction due to the polarization scramblers is more likely to occur. In the multi-repeater transmission system according to the present embodiment, however, the polarization scrambler units 20-1, 20-2 . . . have redundant structure as described above. Accordingly, malfunction due to failure of any one of the plurality of polarization scrambler units 20-1, 20-2 . . . can be minimized.

Figure 11:
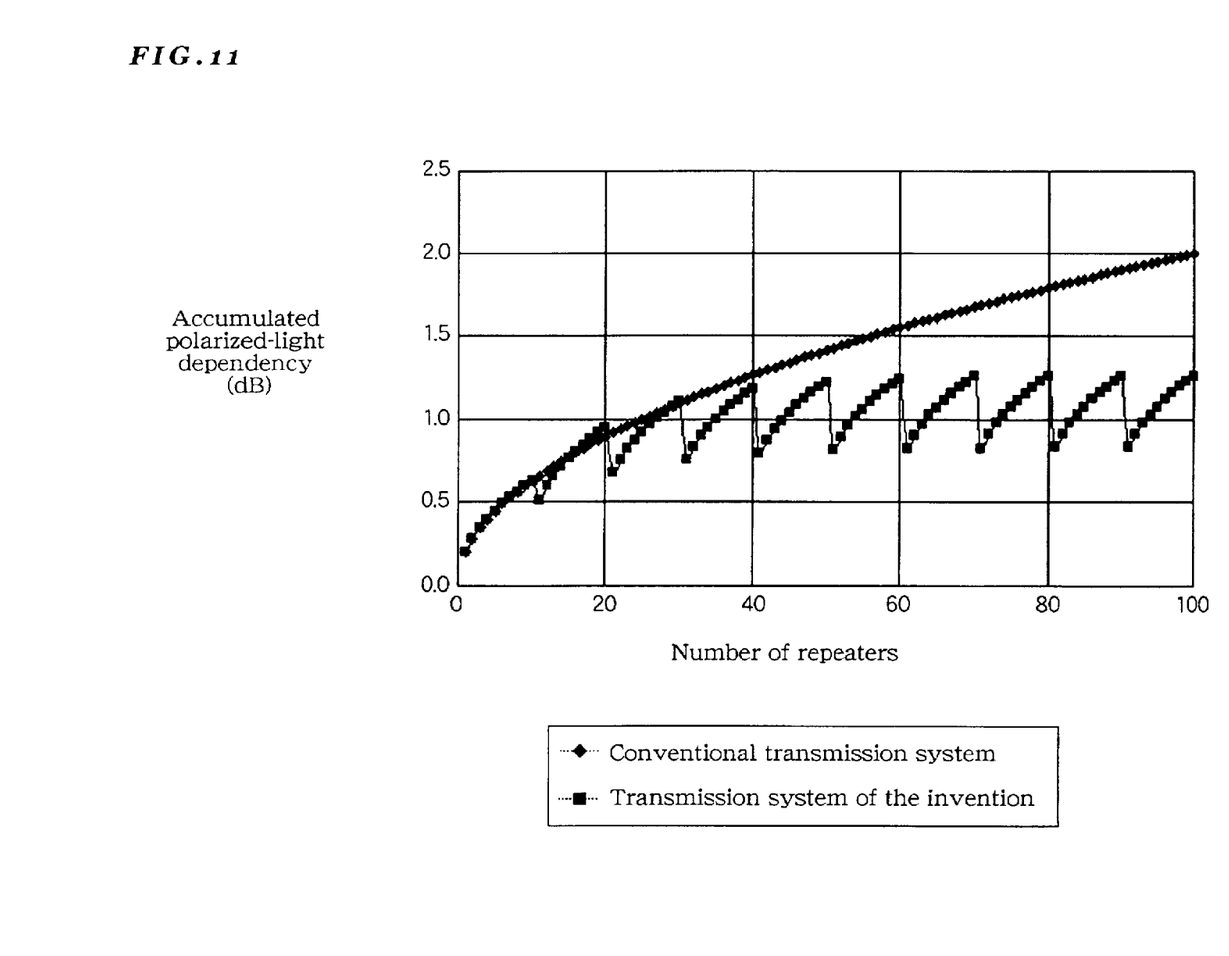
FIG. 11 is a graph showing exemplary gain polarized-light dependency of a multi-repeater transmission system of one embodiment and that of a conventional multi-repeater transmission system.
Figure 12:
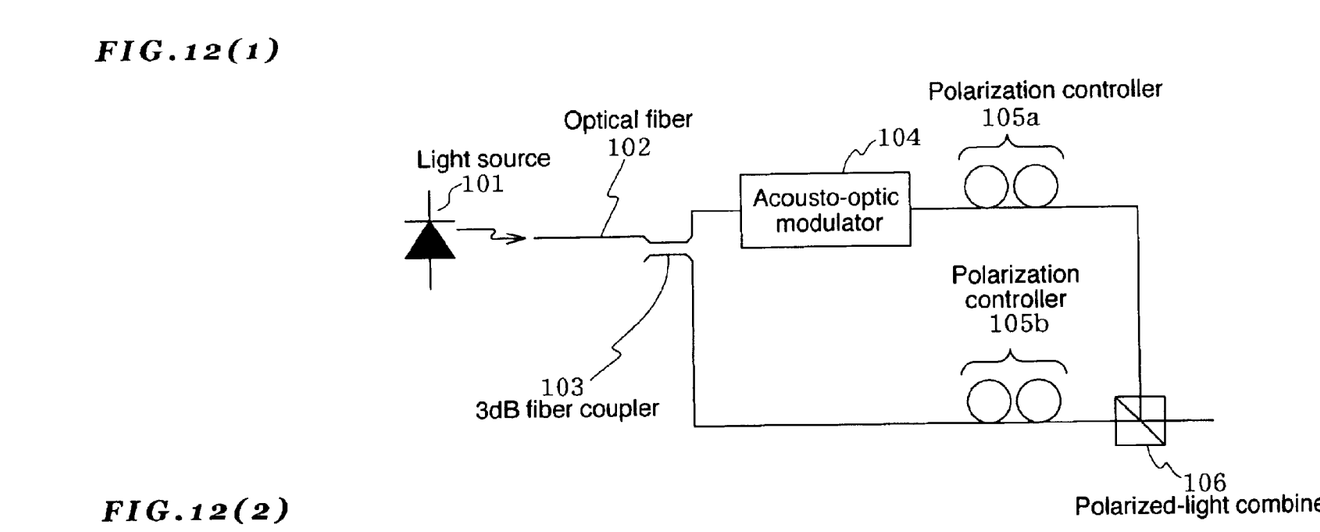

FIG. 11 is a graph showing exemplary gain polarized-light dependency of the multi-repeater transmission system of the present embodiment and that of a conventional multi-repeater transmission system.

In a general multi-repeater transmission system, an average gain polarized-light dependency of optical amplification repeaters is accumulated by a square root of the number of the repeaters. In the multi-repeater transmission system of the present embodiment, the accumulated gain polarized-light dependency is averaged for every ten repeaters. Accordingly, an accumulated value at the input terminal of the eleventh repeater is half the value at the output terminal of the tenth repeater. Specifically, when the average gain polarized-light dependency of the optical amplification repeaters is PDG (AVE), $11 \leq n \leq 19$, the accumulated value at the output terminal of "n" th repeater will be PDG(AVE)×$\sqrt{10}/2$+PDG(AVE)×$\sqrt{(n-10)}$. This also applies to the case of more than twenty repeaters. As can be appreciated from FIG. 11, in the multi-repeater transmission system of the invention, an accumulated gain polarized-light dependency becomes smaller than that of a conventional system when more than 30 repeaters are used. This is confirmed by assessment of main signal characteristics and monitor signal characteristics.

The polarization scramble unit of the invention is provided with: a plurality of polarization scramblers; a switching unit for coupling a transmission line fiber to one of the polarization scramblers, a detection unit for detecting an output signal from the polarization scrambler coupled to the transmission line fiber; and a controlling unit for switching, via the switching unit, between the polarization scrambler and other polarization scrambler when a false output signal is detected by the detection unit. Even when failure occurs in the polarization scrambler in use, it is automatically switched to other polarization scrambler, thereby enhancing reliability. As a result, trouble and loss caused by a failure polarization scrambler can be minimized.

The multi-repeater transmission system according to the present invention allows correction of accumulated gain polarized-light dependency of the optical amplification repeaters by inserting a plurality of polarization scrambler units of the invention in a transmission line fiber. As a result, the gain polarized-light dependency of the entire multi-repeater transmission system can be reduced regardless of gain polarized-light dependency of each optical amplification repeater. Since each polarization scrambler unit employs a redundant structure, drawbacks caused by use of a plurality of polarization scramblers can be solved, thereby enhancing reliability. Thus, trouble and loss caused by a failure polarization scrambler can be minimized.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-251050 (Filed on Aug. 22, 2001) including specification, claims, drawings and summary are incorporated herein by reference in its entirety.

What is to be claimed:

1. A polarization scrambler unit, comprising:
   a plurality of polarization scramblers;
   a switching unit for coupling one of the polarization scramblers to a transmission line fiber;
   a detection unit for detecting an output signal from the polarization scrambler coupled to the transmission line fiber; and
   a controlling unit for switching the polarization scrambler to another polarization scrambler using the switching unit when the output signal detected by the detection unit comprises a false output signal,
   wherein the controlling unit comprises:
      a clock detecting circuit for detecting a clock signal from the output signal from the transmission line fiber; and
      a scrambler driving circuit for driving the polarization scrambler synchronously with the clock signal detected by the clock detecting circuit.

2. A polarization scrambler unit, comprising:
   a plurality of polarization scramblers;
   a switching unit for coupling one of the polarization scramblers to a transmission line fiber;
   a detection unit for detecting an output signal from the polarization scrambler coupled to the transmission line fiber; and
   a controlling unit for switching the polarization scrambler to another polarization scrambler using the switching unit when the output signal detected by the detection unit comprises a false output signal,
   wherein the switching unit comprises:
      an optical switch inserted between the polarization scrambler and the transmission line fiber; and
      a switch driving circuit for opening and closing the optical switch, and
   wherein the controlling unit comprises:
      a clock detecting circuit for detecting a clock signal from the output signal from the transmission line fiber; and
      a scrambler driving circuit for driving the polarization scrambler synchronously with the clock signal detected by the clock detecting circuit.

3. A polarization scrambler unit, comprising:
   a plurality of polarization scramblers;
   a switching unit for coupling one of the polarization scramblers to a transmission line fiber;
   a detection unit for detecting an output signal from the polarization scrambler coupled to the transmission line fiber; and
   a controlling unit for switching the polarization scrambler to another polarization scrambler using the switching unit when the output signal detected by the detection unit comprises a false output signal,
   wherein the switching unit comprises:
      an optical amplifier inserted between the polarization scrambler and the transmission line fiber; and
      an amplifier controlling circuit for controlling the optical amplifier, and
   wherein the controlling unit comprises:
      a clock detecting circuit for detecting a clock signal from the output signal from the transmission line fiber; and
      a scrambler driving circuit for driving the polarization scrambler synchronously with the clock signal detected by the clock detecting circuit.

4. A polarization scrambler unit, comprising:
   a plurality of polarization scramblers;
   a switching unit for coupling one of the polarization scramblers to a transmission line fiber;
   a detection unit for detecting an output signal from the polarization scrambler coupled to the transmission line fiber; and
   a controlling unit for switching the polarization scrambler to another polarization scrambler using the switching unit when the output signal detected by the detection unit comprises a false output signal,
   wherein the polarization scrambler comprises a set of serially connected high-speed and low-speed polarization scramblers.

5. A polarization scrambler unit, comprising:
a plurality of polarization scramblers;
a switching unit for coupling one of the polarization scramblers to a transmission line fiber;
a detection unit for detecting an output signal from the polarization scrambler coupled to the transmission line fiber; and
a controlling unit for switching the polarization scrambler to another polarization scrambler using the switching unit when the output signal detected by the detection unit comprises a false output signal,
wherein the switching unit comprises:
an optical switch inserted between the polarization scrambler and the transmission line fiber; and
a switch driving circuit for opening and closing the optical switch, and
wherein the polarization scrambler comprises a set of serially connected high speed and low-speed polarization scramblers.

6. A polarization scrambler unit, comprising:
a plurality of polarization scramblers;
a switching unit far coupling one of the polarization scramblers to a transmission line fiber;
a detection unit for detecting an output signal from the polarization scrambler coupled to the transmission line fiber; and
a controlling unit for switching the polarization scrambler to another polarization scrambler using the switching unit when the output signal detected by the detection unit comprises a false output signal,
wherein the switching unit comprises:
an optical amplifier inserted between the polarization scrambler and the transmission line fiber; and
an amplifier controlling circuit for controlling the optical amplifier, and
wherein the polarization scrambler comprises a set of serially connected high-speed and low-speed polarization scramblers.

7. A polarization scrambler unit, comprising:
a plurality of polarization scramblers;
a switching unit for coupling one of the polarization scramblers to a transmission line fiber;
a detection unit for detecting an output signal from the polarization scrambler coupled to the transmission line fiber; and
a controlling unit for switching the polarization scrambler to another polarization scrambler using the switching unit when the output signal detected by the detection unit comprises a false output signal,
wherein the polarization scrambler comprises serially connected first-speed and second-speed polarization scramblers.

8. A polarization scrambler unit, comprising:
a plurality of polarization scramblers;
a switching unit for coupling one of the polarization scramblers to a transmission line fiber;
a detection unit for detecting an output signal from the polarization scrambler coupled to the transmission line fiber; and
a controlling unit for switching the polarization scrambler to another polarization scrambler using the switching unit when the output signal detected by the detection unit comprises a false output signal,
wherein the polarization scrambler comprises at least one of serially connected high-speed and low-speed polarization scramblers.

9. A multi-repeater transmission system in which a transmitter and a receiver are connected via a transmission line fiber and a plurality of optical amplification repeaters are inserted in the transmission line fiber,
wherein a plurality of polarization scrambler units are inserted in the transmission line fiber,
wherein each of the polarization scrambler units comprises:
a plurality of polarization scramblers;
a switching unit for coupling one of the polarization scramblers to a transmission line fiber;
a detection unit for detecting an output signal from the polarization scrambler coupled to the transmission line fiber; and
a controlling unit for switching the polarization scrambler to another polarization scrambler using the switching unit when the output signal detected by the detection unit comprises a false output signal, and
wherein the polarization scrambler comprises a set of serially connected high-speed and low-speed polarization scramblers.

* * * * *